United States Patent [19]
Abe et al.

[11] Patent Number: 5,465,573
[45] Date of Patent: Nov. 14, 1995

[54] MULTI-STAGE HONEYCOMB HEATER

[75] Inventors: Fumio Abe, Handa; Tadato Ito, Nagoya; Masato Ogawa, Komaki, all of Japan

[73] Assignee: NGK Insulators, Ltd., Japan

[21] Appl. No.: 91,917

[22] Filed: Jul. 16, 1993

[30] Foreign Application Priority Data

Jul. 29, 1992  [JP]  Japan .................................. 4-202061
Jul. 29, 1992  [JP]  Japan .................................. 4-202062

[51] Int. Cl.⁶ .............................. F01N 3/20; B60L 1/02
[52] U.S. Cl. .................. 60/274; 55/466; 55/485; 55/DIG. 30; 60/300; 60/303; 96/130; 219/205; 219/553; 392/320; 392/490; 422/171; 422/174; 423/213.7
[58] Field of Search ............................ 60/300, 303, 274; 422/171, 174; 423/213.7; 219/202, 205, 206, 553; 55/DIG. 30, 485, 466; 392/320, 490, 478; 96/130

[56] References Cited

U.S. PATENT DOCUMENTS

| | | | |
|---|---|---|---|
| 5,146,743 | 9/1992 | Maus | 60/274 |
| 5,234,668 | 8/1993 | Harada | 55/DIG. 30 |
| 5,259,190 | 11/1993 | Bagley | 60/303 |

FOREIGN PATENT DOCUMENTS

| | | |
|---|---|---|
| 3-295184 | 4/1991 | Japan . |
| 3-500911 | 6/1991 | Japan . |

*Primary Examiner*—Douglas Hart
*Attorney, Agent, or Firm*—Parkhurst, Wendel & Rossi

[57] ABSTRACT

A multi-stage honeycomb heater includes: at least two honeycomb heaters electrically connected with each other and disposed along a stream of fluid; the two honeycomb heaters including furthest upstream honeycomb heater and a an adjacent honeycomb heater which is adjacent to and downstream of the furthest upstream honeycomb heater; each of the two honeycomb heaters having an electrically conductive honeycomb structure the honeycomb structure of the upstream honeycomb heater having slits for adjusting its electrical resistance and/or element for adjusting heat capacity of the honeycomb structure so that the ratio of applied power to heat capacity of the furthest upstream honeycomb heater is larger than the ratio of applied power to heat capacity of the adjacent honeycomb heater. Thus the upstream heater and the downstream heater can give similar temperature increases without a temperature distribution along a flow direction during the engine warm-up. A catalyst composition is coated on the partition walls of the honeycomb structure, and the light-off temperature of the catalyst composition of the upstream honeycomb heater is lower than that of the adjacent honeycomb heater.

20 Claims, 4 Drawing Sheets

MULTI-STAGE HONEYCOMB HEATER

BACKGROUND OF THE INVENTION

(1) Field of the Invention

The present invention relates to a multi-stage honeycomb heater comprising at least two honeycomb heaters, which can be suitably used, for example, as a preheater disposed in the exhaust system of an automobile engine for purifying the exhaust.

(2) Related Art

Converters for the exhaust of an automobile engine have been researched in order to convert harmful substances such as nitrogen oxides (NOx), carbon monoxide (CO), hydrocarbons (HC) and the like contained in automobile exhaust gases. In recent years, with the intensified regulation for the exhaust of an automobile engine, the conversion of the harmful substances particularly at the engine start-up has become an important technical task.

When the temperature of an exhaust gas is low (e.g. right after the engine start-up), the catalyst composition used in the exhaust system is unable to reach the light-off temperature and consequently is unable to purify the exhaust gas sufficiently. Moreover, a large amount of unburnt hydrocarbons are generated during engine warm-up, as compared to steady operation; as a result, the amount of harmful substances emitted during the engine start-up occupies a large portion of the total amount of harmful substances emitted.

As one means for achieving the above task, an electrically conductive heater capable of generating heat when electric current is applied, is provided in the exhaust system of an automobile, and the heater is energized prior to or simultaneously with the engine start-up so as to quickly heat a catalyst composition loaded thereon to the light-off temperature of the catalyst. In the same manner, a main catalyst element provided downstream of the heater but in the vicinity thereof, may be heated also to the light-off temperature of the catalyst.

For example, Japanese Patent Application Kokai (Laid-Open) No. 295184/1991 applied by the present applicant discloses a resistance adjusting type heater including a honeycomb structure having a plurality of passages, at least two electrodes for energizing the honeycomb structure and a resistance adjusting mechanism such as a slit provided between the electrodes.

National Publication of International Application No. 500911/1991 discloses a heater comprising at least two heaters provided in series, each capable of generating heat upon being energized.

In these heaters, however, all the portions of a honeycomb structure of a heater are not uniformly heated to the light-off temperature of the catalyst composition. The upstream portion, i.e., the exhaust gas inlet side of the honeycomb structure is cooled by the cold exhaust gas of relatively low temperature during the engine warm-up so that the upstream portion does not reach the light-off temperature of the catalyst composition as fast as the downstream portions of the honeycomb structure.

Meanwhile, the heat generated in the upstream portion of the honeycomb structure of the heater is transferred by the exhaust gas to the downstream portion of the structure. Consequently, the honeycomb structure has a temperature distribution along the flow path of the exhaust gas. In this case, a low temperature in the upstream portion loaded with a catalyst composition does not convert the exhaust gas much.

According to the aforementioned Japanese Patent Application Kokai (Laid-Open) No. 295184/1991, the heater having a resistance adjusting mechanism such as a slit in the honeycomb structure can control the heat generation, thereby ensuring locally or entirely heating the honeycomb structure thereof. The reference, however, does not disclose any specific method for eliminating the temperature distribution of the honeycomb structure along the flow direction of exhaust gas.

In the heater disclosed in National Publication of International Patent Application No. 500911/1991, the heating of each constituent heater is controlled using at least two external switches. However, since no consideration is made to any of the electrical resistance and heat capacity of each constituent heater, the temperature decrease of the upstream portion is unavoidable. Moreover, use of external switches and control thereof needs a complicated system.

SUMMARY OF THE INVENTION

The present invention is intended to solve the aforementioned problems of the conventional techniques. A multi-stage heater of the present invention includes at least two heating elements each of which has a honeycomb structure, and the honeycomb structures may be arranged in series in a stream of fluid so that fluid can pass through the honeycomb structures.

The first object of the present invention is to provide a multi-stage honeycomb heater where the upstream heating element and the downstream heating element can give similar temperature increases without a temperature distribution along a flow direction so that the upstream heating element can give a quicker temperature rise than the downstream heating element.

The second object of the present invention is to provide a multi-stage honeycomb heater where the catalyst composition loaded on the furthest upstream honeycomb heater has a light-off temperature lower than that of the catalyst composition loaded on the honeycomb heater adjacent to and downstream of the furthest upstream honeycomb heater.

According to the first aspect of the present invention, there is provided a multi-stage honeycomb heater for heating fluid flowing therethrough, comprising: at least two honeycomb heaters electrically connected with each other and disposed along a stream of fluid; the at least two honeycomb heaters including a furthest upstream honeycomb heater and a honeycomb heater being adjacent to downstream of the furthest upstream honeycomb heater; each of thee at least two honeycomb heaters having an electrically conductive honeycomb structure having a periphery and two ends, the honeycomb structure including a plurality of passages which are defined by partition walls and extend in an axial direction between the ends; the honeycomb structure of the furthest upstream honeycomb heater having at least one member selected from the group consisting of means for adjusting an electrical resistance of the honeycomb structure and means for adjusting heat capacity of the honeycomb structure so that the ratio of applied power to heat capacity of the furthest upstream honeycomb heater is larger than the ratio of applied power to heat capacity of the adjacent honeycomb heater.

In the first aspect of the present invention, preferably the at least two honeycomb heaters may be electrically connected in series and the electrical resistance of the honeycomb structure of the furthest upstream honeycomb heater is larger than the electrical resistance of the honeycomb structure of the adjacent honeycomb heater. Alternatively, the at least two honeycomb heaters may be electrically connected in parallel and the electrical resistance of the honeycomb structure of the furthest upstream honeycomb heater is smaller than the electrical resistance of the honeycomb structure of the adjacent honeycomb heater.

It is preferable that the heat capacity of the honeycomb structure of the furthest upstream honeycomb heater may be smaller than the heat capacity of the honeycomb structure of the adjacent honeycomb heater.

The open frontal area of the honeycomb structure of the furthest upstream honeycomb heater may be larger than the open frontal area of the honeycomb structure of the adjacent honeycomb heater. The open frontal area refers to an open area for passages relative to a unit area in a surface of one of the two ends or in a cross section perpendicular to the axial direction of a honeycomb structure. The open frontal area can work as a parameter of a balance between passages and partition walls in a cross section.

Preferably the volume of the honeycomb structure of the furthest upstream honeycomb heater is smaller than the volume of the honeycomb structure of the adjacent honeycomb heater. The honeycomb structure of each of the at least two honeycomb heaters may further comprise a catalyst composition coated on the partition walls thereof, having a heat resistant inorganic oxide and a catalytically active noble metal loaded on the inorganic oxide.

According to the second aspect of the present invention, there is provided a multi-stage honeycomb heater for heating a fluid flowing therethrough, comprising: at least two honeycomb heaters electrically connected with each other and each disposed along the flow path of the fluid, each of the at least two honeycomb heaters having: an electrically conductive honeycomb structure having a periphery and two ends, including a plurality of passages which are defined by partition walls and extend in an axial direction between the ends, and a catalyst composition coated on the partition walls of the honeycomb structure, comprising a heat resistant inorganic oxide and a catalytically active noble metal loaded on the inorganic oxide, the at least two honeycomb heaters including a furthest upstream honeycomb heater and a honeycomb heater adjacent to downstream of the furthest upstream honeycomb heater, wherein the light-off temperature of the catalyst composition of the furthest upstream honeycomb heater is lower than the light-off temperature of the catalyst composition of the adjacent honeycomb heater.

It is preferable that an amount of the noble metal in the catalyst composition on the honeycomb structure of the furthest upstream honeycomb heater may be larger than an amount of the noble metal in the catalyst composition on the honeycomb structure of the adjacent honeycomb heater. A geometrical surface area of the honeycomb structure of the furthest upstream honeycomb heater may be larger than a geometrical surface area of the honeycomb structure of the adjacent honeycomb heater.

Preferably at least one slit is formed through the partition walls of each of the honeycomb structures so as to adjust electrical resistance thereof. Each of the honeycomb structures may have a unitary structure formed by sintering a green compact comprising a powder material.

Preferably each of the honeycomb structures further comprises means for applying electric current to the honeycomb structure thereof so as to generate heat.

According to the third aspect of the present invention, there is provided a method for operating the multi-stage honeycomb heater disposed in the exhaust system of an automobile, which comprises energizing the multi-stage honeycomb heater prior to the engine start-up to heat at least the furthest upstream honeycomb heater to the light-off temperature of the catalyst composition contained therein.

According to the fourth aspect of the present invention, there is provided a method for operating the multi-stage honeycomb heater disposed in the exhaust system of an automobile, which comprises energizing the multi-stage honeycomb heater virtually simultaneously with the engine start-up to heat at least the furthest upstream honeycomb heater to the light-off temperature of the catalyst composition contained therein, within 30 seconds from the engine start-up.

In the present invention, the honeycomb structure refers to a structure having a plurality of passages partitioned by partition walls. The passages can have any desired shape in a cross section perpendicular to the axial direction, and a shape of passages, i.e. a cell shape includes such as circle, polygon, corrugation or the like. Preferably the honeycomb structure has a unitary structure prepared by powder metallurgy.

In the present invention, the light-off temperature of a catalyst composition refers to $T_{50}$ (°C.) which is a temperature of an exhaust gas at an inlet of a multiple-stage heater loaded with the catalyst composition when 50% of a pollutant is converted by the heater. To determine $T_{50}$ (°C.), an exhaust gas of a given flow having a given composition is generated in an actual engine, and the exhaust gas is introduced to the heater loaded with the catalyst composition while concentrations of NOx, CO and HC in the exhaust gas are measured at the inlet and outlet of the heater so as to give conversion rates of these pollutants. A temperature of the exhaust gas is raised in a given rate of about 5°–10° C. per minute. When the temperature of the exhaust gas at the inlet of the heater reaches a point so that 50% of a pollutant is converted by the heater, the temperature is determined to be the light-off temperature. In this test a gas flow and an air to fuel ratio, which may be abbreviated as A/F, can generally be any points in the range of 0.5–1.5 Nm$^3$/min and 14–19, respectively. An air to fuel ratio of 14.6 is close to stoichiometry, and this value is usually used. Since hydrocarbons are a main pollutant in the exhaust gas during the engine warm-up, it is important to decrease a low light-off temperature for hydrocarbons.

In the present invention, in order to make the light-off temperature of the catalyst composition loaded on the furthest upstream honeycomb heater lower than the light-off temperature of the catalyst composition loaded on the adjacent honeycomb heater, various measures can be employed such as:

(1) control of the amount of noble metal in catalyst composition, (2) control of the content of noble metal in catalyst composition, (3) control of the type of noble metal in catalyst composition, and (4) control of the geometrical surface area of honeycomb heater. These measures can be specifically taken, for example, by:

(1) making the amount of noble metal loaded on the furthest upstream honeycomb heater larger than the amount of noble metal loaded on the adjacent honeycomb heater, (2) making an amount of Rh in the catalyst composition in the furthest upstream honeycomb heater larger than an amount of Rh in the catalyst composition in the adjacent honeycomb heater, (3) allowing the catalyst composition on the furthest upstream honeycomb heater to contain at least Pd, and (4) making the geometrical surface area of the furthest upstream honeycomb heater larger than the geometrical surface area of the adjacent honeycomb heater.

The multi-stage honeycomb heater of the present invention is constituted as mentioned above, wherein the ratio of applied power to heat capacity of the furthest upstream honeycomb heater is larger than the ratio of applied power to heat capacity of the adjacent honeycomb heater. As a result, in the present multi-stage honeycomb heater, the furthest upstream honeycomb heater is heated at a higher rate than the adjacent honeycomb heater.

Therefore, the furthest upstream honeycomb heater is not cooled as much by a cold exhaust gas generated during engine warm-up; and all of the heating elements of the multi-stage honeycomb heater can be heated more uniformly to the light-off temperature of catalyst composition.

Further, by heating the furthest upstream honeycomb heater at a higher rate, the heat generated by a catalytic reaction in the furthest upstream honeycomb heater can be effectively used to heat the adjacent honeycomb heater.

BRIEF DESCRIPTION OF THE DRAWINGS

FIGS. 3($a$) and 3($b$) are graphs showing the temperature distributions of the multi-stage honeycomb heaters of Example 1 and Comparative Example 1, respectively.

DETAILED DESCRIPTION OF THE INVENTION

The present invention is hereinafter described in detail.

In the first aspect of the present invention, in order to control the ratio of applied power to heat capacity of each honeycomb heater, at least two honeycomb heaters are electrically connected in series and/or parallel to have different resistances thereby controlling the voltages applied to respective heaters. In this method, it is possible to control the ratio of applied power to heat capacity of each heater by controlling only the electrical resistance of each heater without controlling the volume of each heater.

The serial electrical connection of honeycomb heaters is preferred to the parallel electrical connection because the former connection can give a larger electrical resistance and consumes a smaller amount of electricity and the system power loss is smaller.

The electrical resistance of each honeycomb heater depends upon the open frontal area, thickness, material, porosity, etc. of the honeycomb structure, and the electrical resistance is controlled to a desired level by appropriately selecting these parameters. Alternatively, the electrical resistance of honeycomb heater is preferably controlled by forming slits through partition walls of a honeycomb structure so as to increase an electrical path in the honeycomb structure. Such slits can be formed relatively easily. A direction of the slit may be parallel to the axial direction along the passages. In this case, an electrical resistance increases as the number of slits increases thereby increasing electricity path through the honeycomb structure.

The method of controlling the ratio of applied power to heat capacity of each heating element by controlling only the electrical resistance of each heating element is explained in the case of a two-stage honeycomb heater, which has two heating elements, as an example. In order to make the ratio of applied power to heat capacity of the upstream honeycomb heater larger than the ratio of applied power to heat capacity of the downstream honeycomb heater, an electrical resistance of the upstream honeycomb heater be made larger than the electrical resistance of the downstream honeycomb heater when the two honeycomb heaters are connected electrically in series. On the other hand, when they are connected electrically in parallel, the electrical resistance of the upstream honeycomb heater may be smaller than the electrical resistance of the downstream honeycomb heater.

The ratio of the electrical resistance of the upstream honeycomb structure to the electrical resistance of the downstream honeycomb structure is preferably 1.2–5 in both electrical connection. When the electrical resistance ratio is smaller than 1.2, the upstream heater may be cooled by a cold exhaust gas during the cold start. When the electrical resistance ratio is larger than 5, the number of slits is inevitably large, resulting in low ability of exhaust gas purification.

The ratio of the electrical resistance more preferably ranges from 1.5 to 2.5. When the electrical resistance ratio is in this range, the upstream honeycomb heater and the downstream honeycomb heater show similar temperatures during the cold start or engine warm-up.

In the present invention, the ratio of applied power to heat capacity can also be controlled by another method. Only the heat capacity of heaters may be controlled without controlling the electrical resistance of heaters, whereby the ratio of applied power to heat capacity can be controlled.

The heat capacity of heaters is preferably controlled by the volume or open frontal area (rib thickness, number of cells) of there honeycomb structures, but may also be controlled by the material, porosity, or wash coat thickness of heaters or by controlling all of the parameters.

In order to make the heat capacity of the furthest upstream honeycomb heater larger than the heat capacity of the adjacent honeycomb heater, there can be preferably used an approach where the open frontal area of the furthest upstream honeycomb heater is made larger than the open frontal area of the adjacent honeycomb heater, or an approach where the volume of the furthest upstream honeycomb heater is made smaller than the volume of the adjacent honeycomb heater. Further, the material, porosity or wash coat thickness of each honeycomb heater may be controlled, or all of the parameters may be controlled.

The method of controlling the ratio of applied power to heat capacity of each heater by controlling only the heat capacity of each heater is explained on the case of two-stage honeycomb heater. In order to make the ratio of applied power to heat capacity of the upstream honeycomb heater larger than the ratio of applied power to heat capacity of the downstream honeycomb heater, it is necessary that the heat capacity of the upstream honeycomb heater be made smaller than the heat capacity of the downstream honeycomb heater. Hence, for example, when the heat capacity is controlled by the open frontal area of honeycomb heater, the open frontal area of the upstream honeycomb heater is made larger than the open frontal area of the downstream honeycomb heater. When the heat capacity is controlled by the volume of honeycomb heater, the volume of the upstream honeycomb heater is made smaller than the volume of the downstream honeycomb heater.

The ratio of the heat capacity of the upstream honeycomb heater to the heat capacity of the downstream honeycomb heater is preferably 1.2–5. When the heat capacity ratio is smaller than 1.2, the upstream heater may be cooled by the exhaust during the cold start. When the heat capacity ratio is larger than 5, the volume of the upstream honeycomb heater is inevitably too small and the open frontal area of the heater is inevitably too large, causing reduction in exhaust gas purification ability of the multi-stage honeycomb heater.

The heat capacity ratio is more preferably 1.5–2.5. When the heat capacity ratio is in this range, the upstream honeycomb heater and the downstream honeycomb heater show similar temperature increases during the cold start.

In summary, in order to control the ratio of applied power to heat capacity of each honeycomb heater by controlling the electrical resistance and/or heat capacity of each honeycomb heater, the ratio of applied power to heat capacity of the upstream honeycomb heater is preferably 1.2–5 times, more preferably 1.5–2.5 times the ratio of applied power to heat capacity of the downstream honeycomb heater when the multi-stage honeycomb heater is a two-stage honeycomb heater. When the former ratio is smaller than 1.2 times the latter ratio, it is impossible to lessen the cooling of the upstream honeycomb heater during the cold start. On the other hand, when the former ratio is larger than 5 times the latter ratio, the two-stage honeycomb heater has a low ability for exhaust gas purification.

When the multi-stage honeycomb heater has three or more heating elements arranged in the exhaust system, it is essential that the furthest upstream heating element and the adjacent (second-stage) heating element have the same relation as above, with respect to the ratio of applied power to heat capacity. In addition, the second heating element and the third heating element as well as subsequent two adjacent heating elements may satisfy the relation of the ratio of applied power to heat capacity.

In the present invention, the ratio of applied power (KW) to heat capacity (J/°C.) is a parameter for a temperature elevation rate of a honeycomb heater, and the rate is preferably 10°–400° C./sec for the furthest upstream honeycomb heater. When the rate is smaller than 10° C./sec, the resulting multi-stage honeycomb heater has a low ability for exhaust gas purification. When the rate is larger than 400° C./sec, the multi-stage honeycomb heater requires too much power thereby increasing an energy loss of the system. The rate is more preferably 15°–100° C./sec.

As described above, in the multi-stage honeycomb heater of the first aspect of the present invention, since the furthest upstream honeycomb heater is heated at a higher rate than the adjacent honeycomb heater, the furthest upstream honeycomb heater and the adjacent honeycomb heater can give similar temperature elevations even though there are, during the engine operation, the cooling of furthest upstream honeycomb heater and heat transfer from the heater to adjacent honeycomb heater by exhaust gas. As a result, when a catalyst composition is loaded on each heater, all the heaters can reach the light-off temperature of the catalyst composition uniformly. Further, owing to the high temperature elevation rate of the furthest upstream honeycomb heater, the heat generated by a catalytic reaction in the furthest upstream honeycomb heater can be utilized to heat the adjacent heater.

In the multi-stage honeycomb heater of the second aspect of the present invention, the light-off temperature of the catalyst composition of the furthest upstream honeycomb heater is lower than the light-off temperature of the catalyst composition of the adjacent honeycomb heater so that the catalyst composition loaded on the furthest upstream honeycomb heater quickly reaches its light-off temperature even though the heater is cooled by a cold exhaust gas during the engine warm-up.

Then, the second aspect of the present invention is described in detail.

In the present invention, in order to make the light-off temperature of the catalyst composition of the furthest upstream honeycomb heater lower than the light-off temperature of the adjacent honeycomb heater, there can be employed a method of making the amount of a noble metal in the catalyst composition coated on the furthest upstream honeycomb heater larger than the amount of a noble metal in the catalyst composition coated on the adjacent honeycomb heater. As is well known, a larger amount of a noble metal, which is a catalytically active component, increases a conversion rate of pollutants and decreases a light-off temperature.

In the present invention, the noble metal contained as a catalytically active component in the heat-resistant inorganic oxide is at least one metal selected from Pt, Pd and Rh. Preferably Rh is loaded on at least one of the heaters of the multi-stage honeycomb heater. It is also preferable that at least one of Pt and Pd be loaded on at least the furthest upstream honeycomb heater, thereby increasing a conversion rate of HC. Rh is loaded preferably in separation from other noble metals because Rh easily forms an alloy with other noble metals.

Preferably, the above noble metals are loaded on the furthest upstream honeycomb heater in an amount of 30–120 g/ft$^3$ and on the adjacent honeycomb heater in an amount of 20–100 g/ft$^3$. When the loaded amount is smaller than the lower limit, the honeycomb heater has a high light-off temperature and low heat resistance. On the other hand, when the loaded amount is larger than the upper limit, the light-off temperature of the heater does not decrease any more only to increase a cost. When Rh is loaded in an amount larger than 20 g/ft$^3$, the light-off temperature of heater does not decrease as much with an increased cost.

In the present invention, the catalyst composition coated on each honeycomb heater comprises a heat-resistant inorganic oxide containing the above-mentioned noble metal as an active component. The heat-resistant inorganic oxide includes oxides of relatively large surface area, for example, 50 m$^2$/g or larger, such as $Al_2O_3$, $TiO_2$, $SiO_2$, $ZrO_2$ and the like, as well as a composite oxide thereof. Of these, $Al_2O_3$, $ZrO_2$ or a composite of $Al_2O_3$ and $ZrO_2$ is preferable because they interact with the noble metal contained therein, thereby making the catalyst composition more durable. The presence of a rare earth element oxide (e.g. $CeO_2$ or $La_2O_3$) in the heat-resistant inorganic oxide is preferable so that a window of catalytic activity increases.

In the present invention, in order to make the light-off temperature of the catalyst composition of the furthest upstream honeycomb heater lower than the light-off temperature of the adjacent honeycomb heater, there can also be employed a method of controlling the honeycomb structure of each honeycomb heater, i.e. a method of making the geometrical specific surface area (GSA) of the furthest upstream honeycomb heater larger than the GSA of the adjacent honeycomb heater.

Specifically, the GSA of the furthest upstream honeycomb heater is preferably 20–40 cm$^2$/cm$^3$ [the total geometrical surface area (cm$^2$) of the passage insides per one cubic centimeter of the honeycomb structure] and the GSA of the adjacent honeycomb heater is preferably 15–35 cm$^2$/cm$^3$. When the two GSAs are smaller than the respective lower limits, the resulting multi-stage honeycomb heater has low light-off performance. When the two GSAs are larger than respective upper limits, the multi-stage honeycomb heater has problems in pressure loss of fluid passing therethrough and thermal shock resistance.

The GSA of honeycomb heater is determined by parameters such as cell shape, cell density, rib thickness (wall thickness) and the like. The cell density is preferably 200–800 cells/in$^2$ in the furthest upstream honeycomb heater and 100–600 cells/in$^2$ in the adjacent honeycomb heater in order to appropriately control the GSAs of these heaters.

The rib thickness is preferably small in view of the heat capacity of a honeycomb heater. It is preferably 2–10 mil because too small a rib thickness poses a problem in thermal shock resistance.

In the present invention, it is preferable to control both of (1) the amount of a noble metal in a catalyst composition loaded on each honeycomb heater and (2) the GSA of each honeycomb heater so as to adjust a light-off temperature of the catalyst composition coated on the furthest upstream honeycomb heater so that the catalyst composition on the furthest upstream honeycomb heater functions at low temperatures even though the heater is cooled by a cold exhaust gas.

The light-off temperatures of the catalyst compositions on the furthest upstream honeycomb heater and the adjacent honeycomb heater can also be controlled by controlling, besides the amount of the noble metal loaded on each honeycomb heater and the GSA of each honeycomb heater, the content or kind of a noble metal in the catalyst compositions.

In an embodiment in controlling a content of the noble metal in the catalyst composition to control the light-off temperature of the catalyst composition, the content of Rh in the catalyst composition on the furthest upstream honeycomb heater is made larger than the content of Rh in the catalyst composition on the adjacent honeycomb heater. In this case, the weight ratio of Rh to or,her noble metals is preferably 0.2–0.5 in the furthest upstream honeycomb heater and 0 to less than 0.5 in the adjacent honeycomb heater in view of the cost and performance of honeycomb heater.

In an embodiment in controlling the kind of a noble metal in the catalyst composition to control the light-off temperature thereof, the catalyst composition loaded on the furthest upstream honeycomb heater may contain at least Pd. In this case, an amount of Pd loaded in a unit volume of the honeycomb structure on the furthest upstream honeycomb heater is preferably 10–120 g/ft$^3$. The catalyst composition loaded on the adjacent honeycomb heater may contain Pd but its amount is smaller than that on the furthest upstream honeycomb heater.

The honeycomb structure of the present invention can be made of any material as long as it generates heat when electric current is applied. The material may be a metal or a ceramic. A metal is preferred in view of the mechanical strength. The metal includes, for example, stainless steel and alloys having compositions such as Fe—Cr—Al, Fe—Cr, Fe—Al, Fe—Ni, W—Co, Ni—Cr and the like. Of these, Fe—Cr—Al, Fe—Cr and Fe—Al are preferred because of their excellent heat resistance, oxidation resistance and corrosion resistance and the low cost. These alloys may include a small amount of boron, silicon, zirconium, molybdenum, tungsten, and rare earth oxide such as $Y_2O_3$. A composition of a honeycomb structure may be those disclosed in the U.S. patent application Ser. No. 07/767,889.

When a metal is used, it can be used in a foil shape or by extruding a powdery material into a honeycomb shape and sintering the shaped material. The latter honeycomb structure obtained by extrusion and subsequent sintering is preferred because the production process is simple and the resulting honeycomb structure has a lower cost. The honeycomb heater obtained by powder metallurgy and extrusion is also preferable because it causes no telescope phenomenon and can be heated uniformly.

The honeycomb structure may be porous or nonporous. However, in order to load a catalyst composition, a porous honeycomb structure is preferred because it has strong adhesion to the catalyst composition layer formed thereon and there occurs no peeling of catalyst composition due to the difference in thermal expansion between the porous honeycomb structure and the catalyst composition.

Next, description is made on an example of the process for producing the honeycomb structure of the present invention, particularly a metallic honeycomb structure.

First, a metal powder material is prepared from Fe powder, Al powder, a Cr powder, etc. or from alloy powder of these metals so as to give a desired composition. Then, the metal powder material is mixed with an organic binder, e.g. methyl cellulose or poly(vinyl alcohol), and water. The mixture is extruded into a desired honeycomb shape.

When the metal powder material is mixed with an organic binder and water, it is preferable that an antioxidant (e.g. oleic acid) be added to the metal powder material before addition of water. Alternatively, a metal powder material may be treated in advance so as to have oxidation resistance.

The green compact having a honeycomb structure is fired in a non-oxidizing atmosphere at 1,000°–1,400° C. to obtain a sintered structure. The firing is preferably conducted in a hydrogen-containing non-oxidizing atmosphere because the organic binder contained in the green compact is decomposed and removed by the catalytic action of Fe, etc. also in the green compact, thereby improving a sintered structure.

When the firing temperature is lower than 1,000° C., the green compact does not sinter. When the firing temperature is higher than 1,400° C., the resulting sintered structure is deformed.

Desirably, the sintered structure is coated with a heat-resistant metal oxide, to coat surface of the partition walls and open pores. This coating with a heat-resistant metal oxide is preferably conducted by one of the following methods.

(1) Heat-treat the metal honeycomb heater in an oxidizing atmosphere at 700°–1,100° C.

(2) Apply plating (e.g. gas phase plating) of Al or the like to the partition walls and open pores of the sintered structure, followed by heat treatment in an oxidizing atmosphere at 700°–1,100° C.

(3) Dip the sintered structure in a metal melt of Al of the like, followed by heat treatment in an oxidizing atmosphere at 700°–1,100° C.

(4) Coat an alumina sol or the like on the partition walls and open pores of the sintered structure, followed by heat treatment in an oxidizing atmosphere at 700°–1,100° C.

The heat treatment temperature is preferably 900°–1,100° C. in view of the heat resistance and oxidation resistance of the honeycomb structure obtained.

Preferably, the thus-obtained honeycomb structure is provided with a resistance adjusting mechanism because relatively uniform temperature elevation can be obtained thereby. The resistance adjusting mechanism is preferably slits parallel to the axial direction (passage direction) of the honeycomb structure because the slits can be formed easily.

The above-obtained metallic honeycomb structure is provided with electrodes at the periphery or the inside of the structure by brazing, welding or the like, whereby a honeycomb heater is produced.

The metallic honeycomb structure preferably has an overall electrical resistance of 0.001–0.5 Ω.

A catalyst composition may be loaded on the surface of the above metallic honeycomb structure. This is preferable partly because catalytic conversion of pollutants in the exhaust by an exothermic reaction generates heat.

The catalyst composition loaded on the surface of the metallic honeycomb structure comprises a carrier of a large surface area and a catalytically active substance supported thereon. Typical examples of the carrier of large surface area are $\gamma$-$Al_2O_3$, $TiO_2$, an $SiO_2$—$Al_2O_3$ composite and perovskite type carriers. Examples of the catalytically active substance are noble metals (e.g. Pt, Pd and Rh) and base metals (e.g. Cu, Ni, Cr and Co). A catalyst composition comprising $\gamma$-$Al_2O_3$ and 10–100 g/ft$^3$ of Pt and Pd supported thereon is preferred.

In the present invention, the shape of the honeycomb structure is not particularly restricted. However, it is preferably formed so as to have, for example, a cell density of 6–1,500 cells/in$^2$ (0.9–233 cells/cm$^2$). The thickness of each partition wall (rib thickness) is preferably 50–2,000 μm. As mentioned above, the honeycomb structure may be porous or nonporous and its porosity is not restricted. However, the porosity is desirably 0–50%, preferably less than 25% in view of the mechanical strength, oxidation resistance and corrosion resistance required for the honeycomb structure. When the honeycomb structure is loaded with catalyst composition, the porosity is preferably at least 5% in view of the required adhesion to catalyst composition layer.

The multi-stage honeycomb heater of the present invention is obtained by connecting at least two honeycomb heaters mentioned above, electrically in series and/or parallel and fixing at least two electrodes to the selected honeycomb structures of a multi-stage honeycomb heater. The connection of two adjacent honeycomb heaters is made with an electrically conductive substance, and all the honeycomb heaters are accommodated in a casing via an insulating substance. Optionally, one electrode is connected with the casing to use as an earth.

Next, description is made on how the ratio of applied power to heat capacity of the multi-stage honeycomb heater of the present invention is controlled in actual application of the heater to allow the heater to properly exhibit its performance.

The multi-stage honeycomb heater of the present invention can ordinarily be used as a preheating type whose heating is initiated prior to the engine start-up, or as a post-heating type whose heating is initiated substantially simultaneously with the engine start-up.

In the case of the preheating type, up to the engine start-up, the temperature of each heater is determined by the ratio of applied power to heat capacity of each heater. Therefore, up to the engine start-up, the ratio of applied power to heat capacity is generally controlled by preheating so that the temperature of at least the furthest upstream honeycomb heater, preferably the temperature of the entire multi-stage honeycomb heater reaches the light-off temperature (e.g. 300° C.) of the catalyst composition loaded on the heater. Since, during the engine operation, each heater is not ordinarily energized and cooled by exhaust gas with the furthest upstream honeycomb heater being cooled lowest, the above preheating is conducted so that, for 30 seconds from the engine start-up, the furthest upstream honeycomb heater, preferably the entire multi-stage honeycomb heater can keep at least the light-off temperature of the catalyst composition loaded on each heater.

By the preheating mentioned above, the catalyst composition loaded on the furthest upstream honeycomb heater can favorably convert a large amount of HC and CO generated during the cold start. The heat generated by this conversion enables heating of the adjacent honeycomb heater.

The heater may be heated even after the engine start-up, continuously from the preheating. In this case, at least the furthest upstream honeycomb heater, preferably the entire multi-stage honeycomb heater may be energized so that the temperature of the furthest upstream honeycomb heater or the entire multi-stage honeycomb heater becomes higher than the light-off temperature of the catalyst composition loaded thereon.

In the case of the post-heating type, the heater is energized substantially simultaneously with the engine start-up and resultantly it takes time until the heater reaches the light-off temperature of the catalyst composition loaded thereon. Hence, the ratio of applied power to heat capacity of the furthest upstream honeycomb heater is controlled so that the heater can reach the light-off temperature of the catalyst composition loaded thereon within 30 seconds from the engine start-up, preferably within 20 seconds.

Since the furthest upstream honeycomb heater is cooled by an exhaust gas, the ratios of applied power to heat capacity of the furthest upstream honeycomb heater and the adjacent honeycomb heater are controlled so that the temperature of the former heater is not lower by more than 100° C. than the temperature of the latter heater. Preferably, the temperature of the furthest upstream honeycomb heater is the same as or higher than the temperature of the adjacent honeycomb heater, thereby increasing the purification ability of the present multi-stage honeycomb heater. Also in view of the purification ability, most preferably, the ratio of applied power to heat capacity of the present multi-stage honeycomb heater is controlled so that the heater can reach the light-off temperature of the catalyst composition loaded thereon, within 20 seconds from the engine start-up.

The present invention is hereinafter described in more detail by Examples. However, the present invention is not restricted to these Examples.

[Preparation of multi-stage honeycomb heaters]

Fe powder, Cr—Al powder (Al: 30% by weight), Fe—Al powder (Al: 50% by weight), Fe—B powder (B: 20% by weight) and an $Y_2O_3$ powder all having an average particle diameter of 44 μm or less were mixed so as to give a composition of Fe—12Cr—10Al—0.05B—0.5$Y_2O_3$.

To the mixture were added 4 g, per 100 g of the mixture, of methyl cellulose as organic binder and 1 g, per 100 g of the mixture, of oleic acid as antioxidant to prepare a readily formable body. The body was extruded to obtain a honeycomb compact having a diameter of 3.66 in (93 cm).

Figure 1:
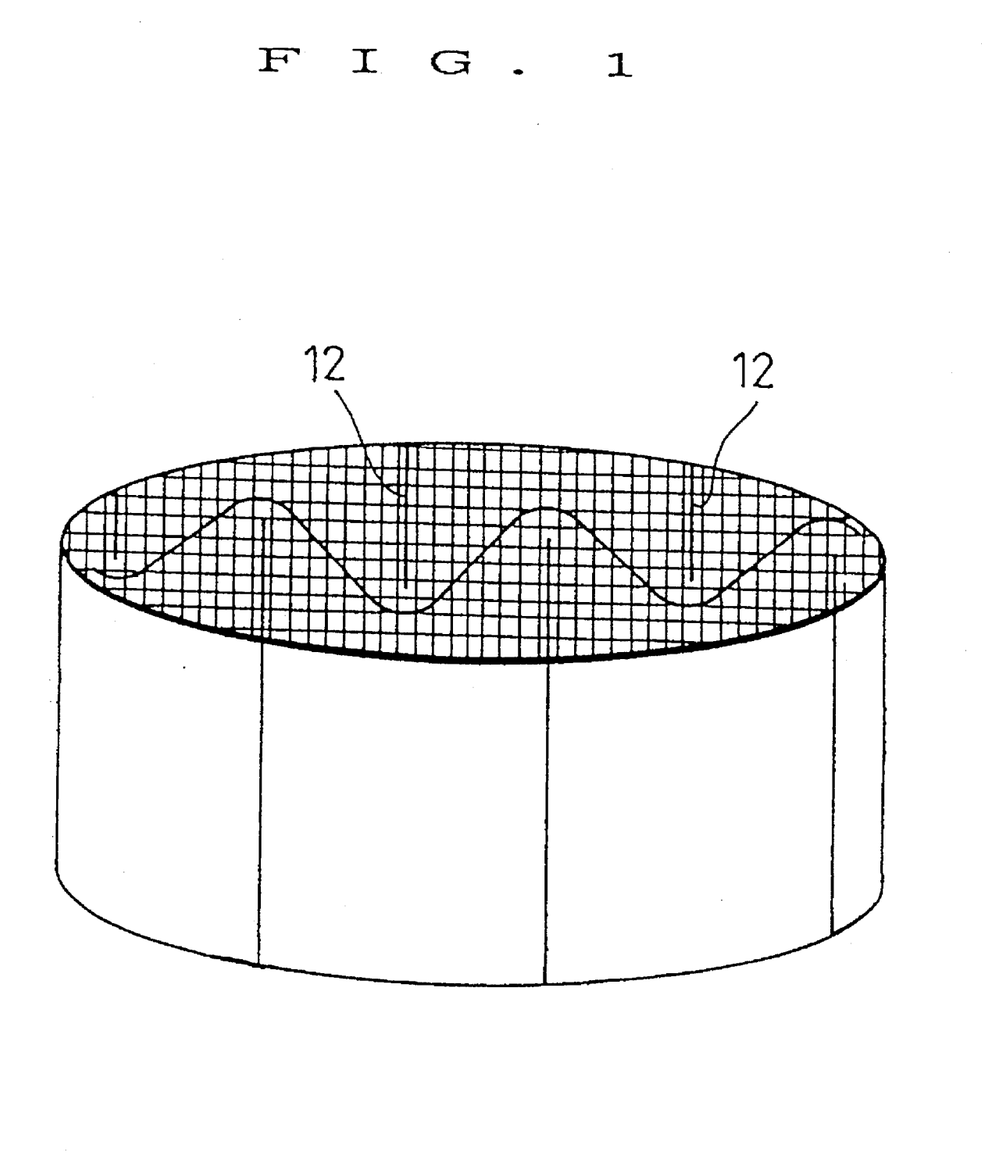
FIG. 1 is a perspective view showing an example of the honeycomb structure used in the multi-stage honeycomb heater of the present invention.

The honeycomb compact was dried at 90° C. for 16 hours and then kept at a maximum temperature of 1,325° C. for 2 hours in a hydrogen atmosphere for sintering, to obtain a honeycomb structure. Thereafter, slits 12 were formed in the honeycomb structure in the axial direction of the passages, as shown in FIG. 1.

The honeycomb structure with slits was coated with a wash coat material consisting of $\gamma$-$Al_2O_3$ in 70 parts and $CeO_2$ in 30 parts followed by impregnation with Pt and Rh so that the ratio of Pt/Rh became 5/1 and the total amount of Pt and Rh loaded became 40 g/ft$^3$, to obtain a honeycomb structure having a catalyst composition loaded thereon.

Figure 2:
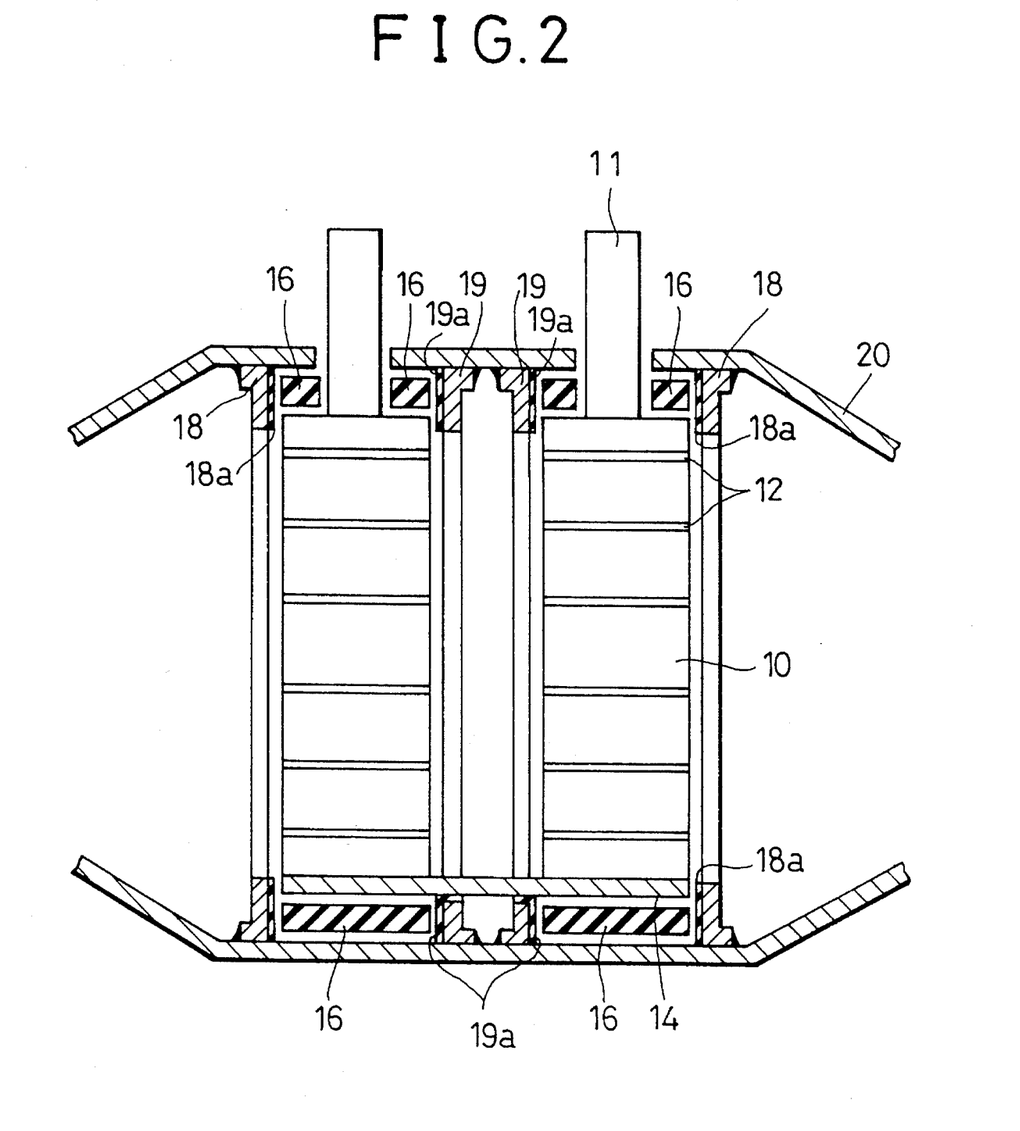
FIG. 2 is a cross-sectional view showing an example of the multi-stage honeycomb heater of the present invention.

As shown in FIG. 2, to the periphery of the honeycomb structure 10 having a catalyst composition loaded thereon was welded a bolt as an electrode 11 for applying electric current to the honeycomb structure so as to generate heat. Two of the thus-obtained honeycomb heaters were electrically connected with each other by welding a metal plate 14 to the peripheries of the honeycomb heaters. The portion of the periphery to which the bolt was welded was opposite to the portion of the periphery to which the metal plate was welded.

The periphery of each honeycomb heater was covered with a mat 16 made of an electrical insulating substance. Each mat 16 had a hole so that the electrode 11 protrudes through the hole. The mat 16 electrically insulates the honeycomb structure 10 from a ring 18 and a casing 20. Also, the mat 16 prevents the honeycomb structure from receiving too large a stress from the casing 20.

The circumference of the end of each honeycomb heater was covered with a ring 18 and a ring 19. The rings 18 and 19 can prevent the leakage of fluid from the gap between the honeycomb structure 10 and the casing 20. Each ring 19 had a hole to enable the fitting of the metal plate 14 therein to. When each ring 19 is made of a metal, the ring 19 and the metal plate 14 are electrically insulated from each other. The surfaces 18a and 19a of rings 18 and 19 may be coated with an electrical insulating substance thereby ensuring the electrical insulation between the rings 18, 19 and the honeycomb structure 10.

Rings 18, 19 may be made of an engineering plastic. The rings may be, for example, one described in U.S. patent application Ser. No. 07/813,606.

The casing 20 is made of a material having a strength sufficient to hold the honeycomb heater and may be made of a metal or a plastic (e.g. engineering plastic). The casing 20 can be completed, for example, by covering the honeycomb heater, the mats 16 and the rings 18 and 19 with two casing parts such as shown in FIG. 2 and then connecting the two casing parts.

By thus holding honeycomb heaters in a casing, there were obtained multi-stage honeycomb heaters of Examples 1–9 and Comparative Example 1 all shown in Table 1. The total volume of each of these multi-stage heater was 0.3 liter. These multi-stage heaters have two heating elements with the sole exception that the multi-stage heater of Example 9 has three heating elements. In the present invention, means for holding honeycomb elements in a casing is not restricted.

TABLE 1

| | | wall thickness/ cell density | volume (l) | heat capacity (J/°C.) | number of slit | elec. path length (mm) | elec. resistnc (mΩ) | ratio of applied power to heat capacity (°C./sec) | electrical connection | A/B |
|---|---|---|---|---|---|---|---|---|---|---|
| Comp. Ex. 1 | upstream | 4 mil/500 cpi$^2$ | 0.15 | 110 | 8 | 480 | 32.6 | 18.2 | series | 1 |
| | downstream | 4 mil/500 cpi$^2$ | 0.15 | 110 | 8 | 480 | 32.6 | 18.2 | | |
| EXAMPLE 1 | upstream | 4 mil/500 cpi$^2$ | 0.15 | 110 | 11 | 650 | 55.2 | 23.9 | series | 2.0 |
| | downstream | 4 mil/500 cpi$^2$ | 0.15 | 110 | 8 | 450 | 28.0 | 11.9 | | |
| 2 | upstream | 4 mil/500 cpi$^2$ | 0.10 | 75 | 8 | 450 | 42.0 | 26.7 | series | 2.0 |
| | downstream | 4 mil/500 cpi$^2$ | 0.20 | 150 | 11 | 650 | 42.0 | 13.3 | | |
| 3 | upstream | 2 mil/250 cpi$^2$ | 0.15 | 58 | 5 | 272 | 33.0 | 34.5 | series | 1.95 |
| | downstream | 4 mil/500 cpi$^2$ | 0.15 | 113 | 8 | 480 | 33.0 | 17.7 | | |
| 4 | upstream | 4 mil/500 cpi$^2$ | 0.15 | 110 | 8 | 450 | 28.0 | 23.6 | parallel | 1.97 |
| | downstream | 4 mil/500 cpi$^2$ | 0.15 | 110 | 11 | 650 | 55.2 | 12.0 | | |
| 5 | upstream | 4 mil/500 cpi$^2$ | 0.10 | 75 | 9 | 550 | 61.8 | 38.1 | series | 5.0 |
| | downstream | 4 mil/500 cpi$^2$ | 0.20 | 150 | 8 | 480 | 24.5 | 7.6 | | |
| 6 | upstream | 4 mil/500 cpi$^2$ | 0.15 | 110 | 8 | 480 | 32.6 | 19.0 | series | 1.16 |
| | downstream | 4 mil/500 cpi$^2$ | 0.15 | 110 | 8 | 450 | 28.0 | 16.4 | | |
| 7 | upstream | 4 mil/500 cpi$^2$ | 0.13 | 100 | 8 | 480 | 36.7 | 22.2 | series | 1.56 |
| | downstream | 4 mil/500 cpi$^2$ | 0.17 | 125 | 8 | 480 | 29.4 | 14.2 | | |
| 8 | upstream | 4 mil/500 cpi$^2$ | 0.13 | 100 | 9 | 550 | 46.3 | 25.9 | series | 2.3 |
| | downstream | 4 mil/500 cpi$^2$ | 0.17 | 125 | 8 | 450 | 25.2 | 11.2 | | |
| 9 | upstream | 4 mil/500 cpi$^2$ | 0.06 | 46 | 6 | 335 | 41.7 | 29.3 | series | 1.98 |
| | middle, and downstream | 4 mil/500 cpi$^2$ | 0.12 | 90 | 8 | 480 | 40.8 | 14.8 | | |

Notes:
Example 9 has three heating elements.
A/B refers to a ratio of (A) the ratio of applied power to heat capacity of the first, i.e., upstream heater to (B) the ratio of applied power to heat capacity of the second, i.e., downstream heater.

[Test by FTP (Federal Test Procedure)]

One of the multi-stage honeycomb heaters of Examples 1–9 and Comparative Example 1 was set beneath the floor of a test automobile having a displacement of 2,400 cc. Downstream of the multi-stage honeycomb heater was disposed a three-way catalyst via a flange. The three-way catalyst has a cylindrical shape with a diameter of 3.66 in., a length of 177 mm, and a volume of 1.2 liters. Holes for introducing a secondary air were formed upstream of the honeycomb heater. Two batteries with 12 V were connected in series to apply a voltage of 24 V to the multi-stage honeycomb heater.

Under the above conditions, a Bag emission was measured according to the FTP (Federal Test Procedure). The multi-stage honeycomb heater was energized substantially simultaneously with the engine start-up, and electric current was applied for 60 seconds with turning electric current on and off so as to control the central portion of the furthest upstream honeycomb heater at 300° C. The intake of secondary air was initiated simultaneously with the engine start-up at a rate of 200 liters/min and stopped after 40 seconds.

The results obtained are shown in Table 2.

TABLE 2

|  |  | FTP total emission (g/mile) | |
|---|---|---|---|
|  | HC | CO | $NO_x$ |
| Comp. Ex. 1 | 0.14 | 1.57 | 0.16 |
| EXAMPLE 1 | 0.05 | 0.90 | 0.12 |
| 2 | 0.04 | 0.80 | 0.12 |
| 3 | 0.04 | 0.80 | 0.12 |
| 4 | 0.05 | 0.90 | 0.12 |
| 5 | 0.09 | 1.30 | 0.13 |
| 6 | 0.08 | 1.20 | 0.13 |
| 7 | 0.07 | 1.10 | 0.12 |
| 8 | 0.07 | 1.10 | 0.12 |
| 9 | 0.08 | 1.20 | 0.12 |

Figure 3A:
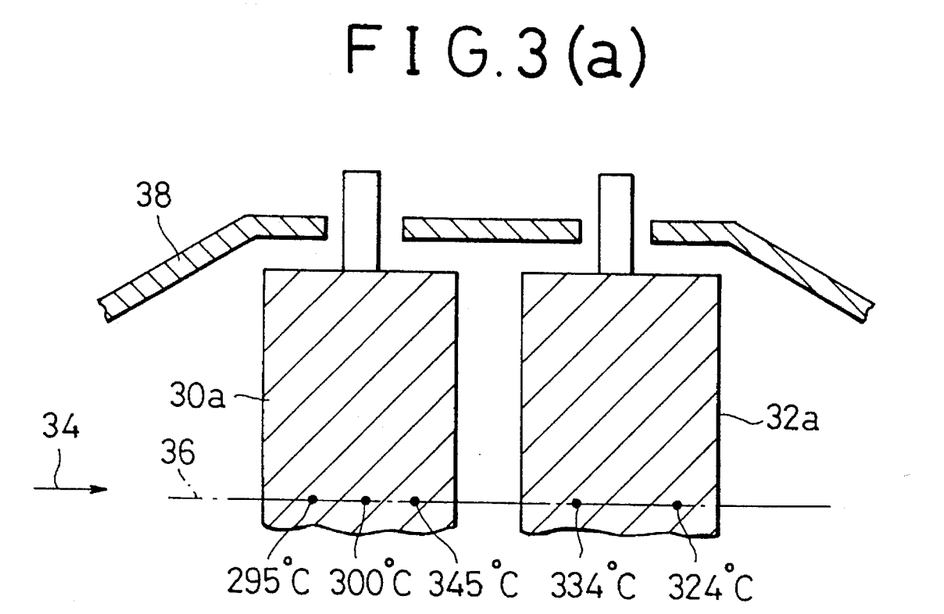
Figure 3B:
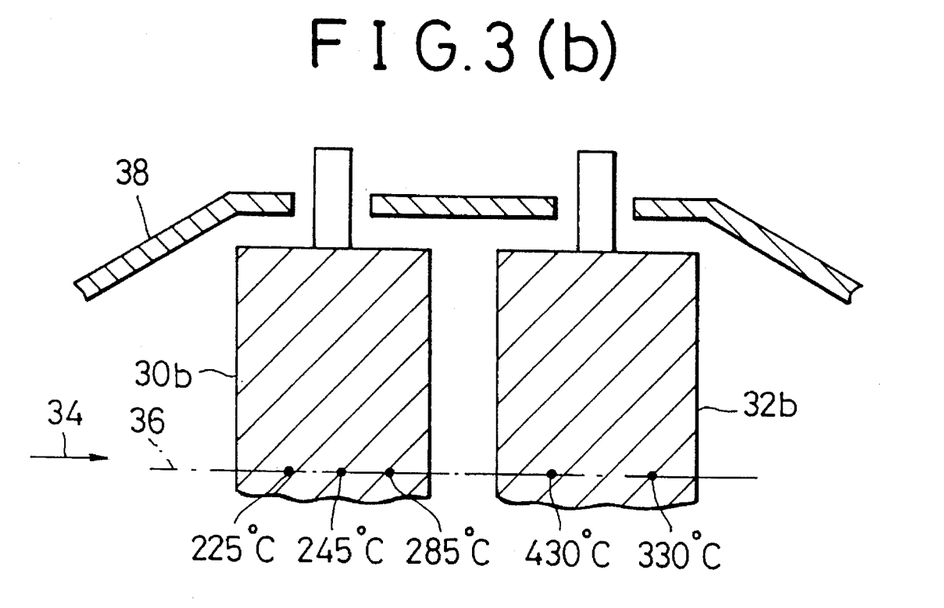

The temperature distributions in the multi-stage honeycomb heaters of Example 1 and Comparative Example 1 are shown in FIGS. 3(a) and 3(b), respectively. In FIGS. 3(a) and 3(b), upstream heating elements 30a and downstream heating elements 32a are arranged in a casing 38. Numeral 36 designates the center axis of the two honeycomb structures having a cylindrical shape. Numeral 34 refers to a flow direction of an exhaust gas. In FIG. 3(a), the center on the center axis 36 having an equal distance to both ends of the honeycomb structure was controlled to have a temperature of 300° C. by turning on and off electric current. The same temperature control as Example 1 was carried out in Comparative Example 1.

The following is clear from the above test results.

(1) The multi-stage honeycomb heaters of Examples according to the present invention show higher performance for exhaust gas purification than the multi-stage honeycomb heater of Comparative Example 1 wherein the upstream honeycomb heater and the downstream honeycomb heater have the same ratio of applied power to heat capacity.

(2) In particular, the multi-stage honeycomb heater of Examples 1–4 and 7–9 wherein the ratio of (A) the ratio of applied power to heat capacity of the furthest upstream honeycomb heater to (B) the ratio of applied power to heat capacity of the adjacent honeycomb heater is in the range of 1.5–2.5, are most effective for reducing harmful substances.

(3) The ratio of applied power to heat capacity of the honeycomb heater can be controlled by controlling only the electrical resistance of honeycomb heater with the heat capacity kept constant or by controlling the volume or open frontal area of honeycomb heater with the electrical resistance kept constant, or by combining them. Employment of any of these controlling methods is more effective for reduction in harmful substances than Comparative Example 1.

Next, the second aspect of the present invention is described in more detail by Examples.

[Formation of honeycomb heaters]

A honeycomb structure was obtained by the above-mentioned method. Slits 12 were formed in this honeycomb strength in the axial direction of the passages, as shown in FIG. 1, whereby honeycomb heaters of carrier Nos. A to D shown in Table 3 were formed.

TABLE 3

| Carrier No. | | wall thickness/ cell density | volume (l) | heat capacity (J/°C.) | number of slit | elec. path length (mm) | elec. resistnc (mΩ) | G.S.A. ($cm^2$/$cm^2$) | ratio of applied power to heat capacity (°C./sec) | electrical connection | A/B |
|---|---|---|---|---|---|---|---|---|---|---|---|
| A | upstream | 4 mil/400 $cpi^2$ | 0.15 | 104 | 8 | 447 | 31.0 | 3881 | 19.2 | series | 1.0 |
|   | downstream | 4 mil/400 $cpi^2$ | 0.15 | 104 | 8 | 447 | 31.0 | 3881 | 19.2 |  |  |
| B | upstream | 4 mil/500 $cpi^2$ | 0.15 | 113 | 8 | 483 | 32.6 | 4289 | 18.1 | series | 0.96 |
|   | downstream | 4 mil/400 $cpi^2$ | 0.15 | 104 | 8 | 447 | 31.0 | 3881 | 18.8 |  |  |
| C | upstream | 4 mil/500 $cpi^2$ | 0.15 | 113 | 8 | 483 | 32.6 | 4289 | 20.0 | series | 1.2 |
|   | downstream | 4 mil/400 $cpi^2$ | 0.15 | 104 | 7 | 397 | 25.1 | 3901 | 16.7 |  |  |
| D | upstream | 4 mil/500 $cpi^2$ | 0.13 | 100 | 8 | 483 | 36.7 | 3813 | 22.2 | series | 1.56 |
|   | downstream | 4 mil/500 $cpi^2$ | 0.17 | 125 | 8 | 483 | 29.4 | 4766 | 14.2 |  |  |

Note:
A/B refers to a ratio of (A) the ratio of applied power to heat capacity of the first, i.e., upstream heater to (B) the ratio of applied power to heat capacity of the second, i.e., downstream heater.

[Formation of honeycomb heaters coated with a catalyst composition]

Commercial $\gamma$-$Al_2O_3$ (BET surface area: 200 $m^2$/g) was impregnated with an aqueous solution of cerium nitrate so that 6% by weight of ceria was loaded on $\gamma$-$Al_2O_3$. The impregnated material was calcinated at 600° C. for 3 hours to obtain an alumina-ceria composite. The alumina-ceria composite was disintegrated by a wet method. Thereto were added 24% by weight, based on $\gamma$-alumina, of ceria powder and an aqueous solution of a noble metal salt in this order. The resulting slurry was dried at 120° C. for at least 15 hours and then fired at 550° C. for 3 hours to obtain a noble metal-$\gamma$-$Al_2O_3$—$CeO_2$ composite. The composite contained one kind of noble metal. The noble metal-$\gamma$-$Al_2O_3$—$CeO_2$ composite was disintegrated by a wet method in the presence of an appropriate amount of acetic acid to obtain a slurry. The slurry was coated as a first layer on each of the carrier Nos. A to D shown in Table 3, then dried at 120° C. and fired at 550° C. for 3 hours. On the first layer was coated, as a second layer, a slurry containing a noble metal different from the noble metal contained in the first layer. The resulting material was subjected to the same drying and firing as above.

[Formation of multi-stage honeycomb heater units]

An electrode was welded to each of the above-obtained honeycomb heaters coated with a catalyst composition. The first-stage heater, i.e. the furthest upstream heater, were electrically connected with the second-stage heater, i.e. the heater adjacent to the first stage heater by an electrically conductive material, such as electrical line. Then, an insulating material was placed on the periphery of the honeycomb heater, and they were accommodated in a casing, to form a multi-stage (two-stage) honeycomb heater units of Examples 10–15 and Comparative Example 2 shown in Table 4.

Each of the multi-stage honeycomb heater units of Examples 10–15 was constituted so that the light-off temperature of the catalyst composition of the first stage honeycomb heater was lower than the light-off temperature of the catalyst composition of the second stage honeycomb The multi-stage honeycomb heater units of Examples 10–15 and Comparative Example 2 were subjected to the same FTP test as above. The results are shown in Table 4.

[Light-off performance of each catalyst composition]

In order to examine the light-off performance of the catalyst compositions of the upstream honeycomb heater and the downstream honeycomb heater, both heaters were canned and placed in a flow of an exhaust of an actual automobile engine. The exhaust has a flow of 1.1 m³ /min and an air to fuel ratio of 14.6. The gas temperature was elevated from 100° C. at a constant rate of 10° C./min. A gas temperature at a heater inlet at which the conversion of HC became 5%, was measured as T (°C.). The results are shown in Table 4.

TABLE 4

| | | Carrier No. | | first layer/ second layer | amount of noble metal loaded (g/ft³) | light-off temp for HC $T_{50\%}$ (°C.) | FTP emission (g/mile) | | |
|---|---|---|---|---|---|---|---|---|---|
| | | | | | | | HC | CO | NO$_x$ |
| EX-AM-PLE | 10 | A | upstream | Pt/Rh = 5/1 | 40 | 300 | 0.09 | 1.15 | 0.13 |
| | | | downstream | Pt/Rh = 5/1 | 30 | 315 | | | |
| | 11 | A | upstream | Pt/Rh = 5/1 | 40 | 300 | 0.09 | 1.10 | 0.12 |
| | | | downstream | Pt/Rh = 10/1 | 40 | 320 | | | |
| | 12 | A | upstream | Pd/Rh = 5/1 | 40 | 285 | 0.08 | 1.15 | 0.12 |
| | | | downstream | Pt/Rh = 5/1 | 40 | 300 | | | |
| | 13 | B | upstream | Pt/Rh = 5/1 | 30 | 300 | 0.09 | 1.15 | 0.13 |
| | | | downstream | Pt/Rh = 5/1 | 30 | 315 | | | |
| | 14 | C | upstream | Pt/Rh = 5/1 | 30 | 300 | 0.08 | 1.10 | 0.13 |
| | | | downstream | Pt/Rh = 5/1 | 30 | 315 | | | |
| | 15 | D | upstream | Pd/Rh = 5/1 | 40 | 310 | 0.07 | 1.05 | 0.12 |
| | | | downstream | Pt/Rh = 5/1 | 30 | 315 | | | |
| Comp. Ex. 2 | | A | upstream | Pt/Rh = 5/1 | 30 | 315 | 0.16 | 1.70 | 0.16 |
| | | | downstream | Pt/Rh = 5/1 | 30 | 315 | | | | heater. The lower light-off temperature of the catalyst composition of the first stage was achieved by changing the total amount of loaded noble metals (Pt and Rh) between the first stage and the second stage, in Example 10; by changing the ratio of loaded noble metals (Pt and Rh) between the first stage and the second stage, in Example 11; and by changing the combination of loaded noble metals between the first stage and the second stage, in Example 12.

The lower light-off temperature of the catalyst composition of the first stage heater was achieved by changing the GSA (geometrical specific surface area) between the first stage and the second stage heaters, in Example 13; and by changing the GSA between the first stage and the second stage and further changing the number of slits between the first stage and the second stage to change the electrical resistance between them and thereby making the ratio of applied power to heat capacity of the first stage heater larger than the ratio of applied power to heat capacity of the second stage heater, in Example 14.

In Example 15, the lower light-off temperature of the catalyst composition of the first stage was achieved by changing the total amount and combination of loaded noble metals between the first stage heater and the second stage heater and further changing the volume between the first stage heater and the second stage heater to allow each stage to have a different heat capacity.

In the multi-stage honeycomb heater of Comparative Example 2, the catalyst composition of the first stage honeycomb heater and the catalyst composition of the second stage honeycomb heater had the same light-off temperature.

[Test by FTP]

As is clear from the above test results, the multistage honeycomb heaters of Examples according to the present invention are superior to that of Comparative Example 2, in exhaust gas conversion.

In each of the multi-stage honeycomb heaters of the present invention, since the catalyst composition of the furthest upstream honeycomb heater has a lower light-off temperature than the catalyst composition of the adjacent honeycomb heater, the catalyst composition of the furthest upstream honeycomb heater can maintain the light-off temperature even though the furthest upstream honeycomb heater is cooled by exhaust gas during the engine operation, and resultantly can achieve excellent exhaust gas conversion.

Each heating element may have two electrodes for applying electric current on the honeycomb structure so as to generate heat. The heating elements may be electrically connected each other through the electrodes.

In the embodiment of FIG. 2, metal plate 14 electrically connects two honeycomb structures 10. Alternatively, each of honeycomb structures may have two electrodes in its periphery, and the honeycomb structures may be electrically connected through electrodes and line.

Figure 4:
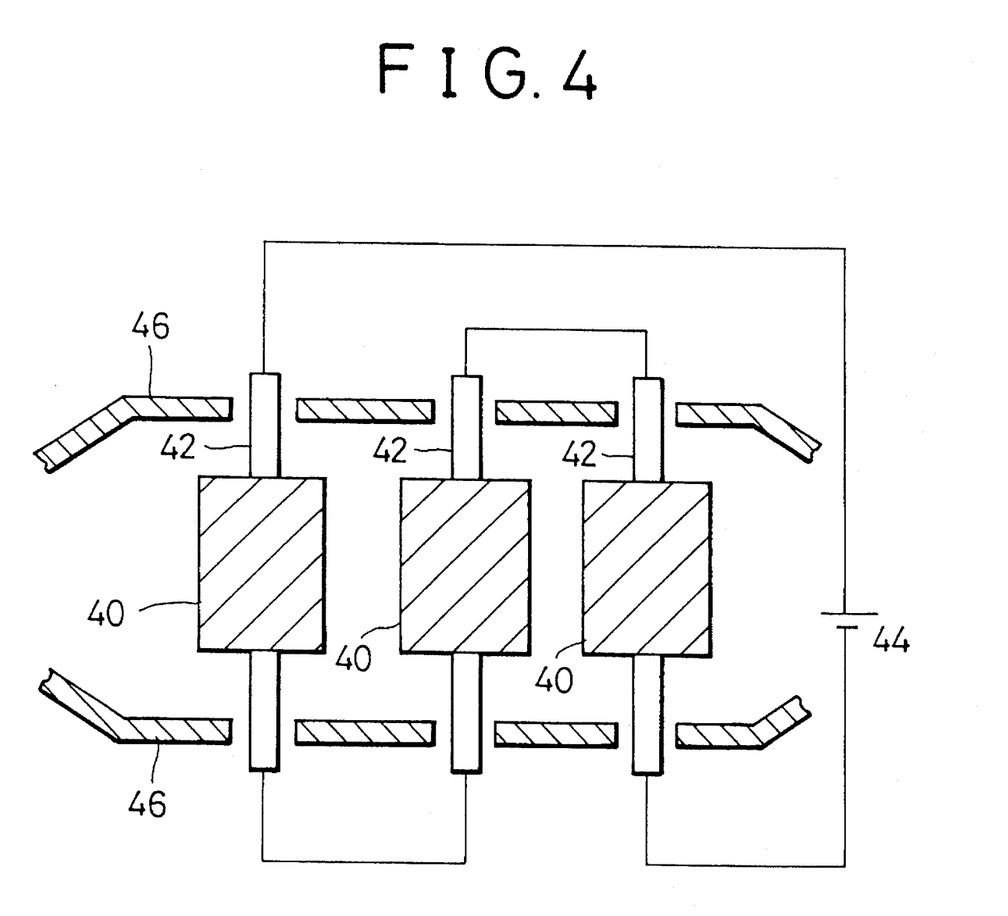
FIG. 4 is a cross-sectional view showing an example of the multi-stage honeycomb heater of the present invention in which the heaters have serial electrical connection.

In FIG. 4, each of three honeycomb structures 40 has two electrodes 42 in the opposite side of its periphery. The three honeycomb structures are electrically connected in series through electrodes 42 and lines to a power source 44. The honeycomb structures are arranged in a casing 46. Rings and mats are omitted in FIG. 4.

What is claimed is:

1. A multi-stage honeycomb heater for heating fluid flowing therethrough, comprising:

at least two honeycomb heaters electrically connected with each other to enable simultaneous energization of said at least two honeycomb heaters, which are disposed along a stream of fluid and include a furthest upstream honeycomb heater and an adjacent honeycomb heater which is adjacent to and downstream of the furthest upstream honeycomb heater;

each of said at least two honeycomb heaters having a honeycomb structure comprised of an electrically conductive material, the honeycomb structure having a periphery and two ends, including a plurality of passages which are defined by partition walls and extend in an axial direction between the ends;

the honeycomb structure of the furthest upstream honeycomb heater having at least one member selected from the group consisting of means for adjusting an electrical resistance of the honeycomb structure and means for adjusting a heat capacity of the honeycomb structure so that the ratio of applied power to heat capacity of the furthest upstream honeycomb heater is larger than the ratio of applied power to heat capacity of the adjacent honeycomb heater when said furthest upstream and adjacent honeycomb heaters are simultaneously energized.

2. A multi-stage honeycomb heater according to claim 1, wherein said at least two honeycomb heaters are electrically connected in series, and the electrical resistance of the honeycomb structure of the furthest upstream honeycomb heater is larger than the electrical resistance of the honeycomb structure of the adjacent honeycomb heater.

3. A multi-stage honeycomb heater according to claim 1, wherein said at least two honeycomb heaters are electrically connected in parallel, and the electrical resistance of the honeycomb structure of the furthest upstream honeycomb heater is smaller than the electrical resistance of the honeycomb structure of the adjacent honeycomb heater.

4. A multi-stage honeycomb heater according to claim 1, wherein the heat capacity of the honeycomb structure of the furthest upstream honeycomb heater is smaller than the heat capacity of the honeycomb structure of the adjacent honeycomb heater.

5. A multi-stage honeycomb heater according to claim 1, wherein the open frontal area of the honeycomb structure of the furthest upstream honeycomb heater is larger than the open frontal area of the honeycomb structure of the adjacent honeycomb heater.

6. A multi-stage honeycomb heater according to claim 1, wherein the volume of the honeycomb structure of the furthest upstream honeycomb heater is smaller than the volume of the honeycomb structure of the adjacent honeycomb heater.

7. A multi-stage honeycomb heater according to claim 1, wherein each of said at least two honeycomb heaters further comprises a catalyst composition coated on the partition walls of its respective honeycomb structure, said catalyst composition having a heat resistant inorganic oxide and a catalytically active noble metal loaded on the inorganic oxide.

8. A multi-stage honeycomb heater for heating fluid flowing therethrough, comprising:

at least two honeycomb heaters electrically connected with each other and disposed along a stream of fluid, each of said at least two honeycomb heaters having (i) a honeycomb structure comprised of an electrically conductive material, the honeycomb structure having a periphery and two ends, including a plurality of passages which are defined by partition walls and extend in an axial direction between the ends, and (ii) a catalyst composition, coated on the partition walls of the honeycomb structure, said catalyst composition comprising a heat resistant inorganic oxide and a catalytically active noble metal loaded on the inorganic oxide, said at least two honeycomb heaters including a furthest upstream honeycomb heater and an adjacent honeycomb heater which is adjacent to and downstream of the furthest upstream honeycomb heater, wherein the light-off temperature of the catalyst composition of the furthest upstream honeycomb heater is lower than the light-off temperature of the catalyst composition of the adjacent honeycomb heater.

9. A multi-stage honeycomb heater according to claim 8, wherein an amount of the noble metal in the catalyst composition of the furthest upstream honeycomb heater is larger than an amount of the noble metal in the catalyst composition of the adjacent honeycomb heater.

10. A multi-stage honeycomb heater according to claim 8, wherein a geometrical surface area of the honeycomb structure of the furthest upstream honeycomb heater is larger than a geometrical surface area of the honeycomb structure of the adjacent honeycomb heater.

11. A multi-stage honeycomb heater according to claim 1 wherein at least one slit is formed through the partition walls of each of the honeycomb structures so as to adjust electrical resistance thereof.

12. A multi-stage honeycomb heater according to claim 1 wherein each of the honeycomb structures has a unitary structure formed by sintering a green compact comprising a powder material.

13. A multi-stage honeycomb heater according to claim 1 wherein each of the honeycomb structures further comprises means for applying electric current to the honeycomb structure thereof so as to generate heat.

14. A multi-stage honeycomb heater according to claim 13, wherein the means for applying electric current comprises an electrode in electrical contact with each of the honeycomb structures.

15. A multi-stage honeycomb heater according to claim 8, wherein at least one slit is formed through the partition walls of each of the honeycomb structures so as to adjust electrical resistance thereof.

16. A multi-stage honeycomb heater according to claim 8, wherein each of the honeycomb structures has a unitary structure formed by sintering a green compact comprising a powder material.

17. A multi-stage honeycomb heater according to claim 8, wherein each of the honeycomb structures further comprises means for applying electric current to the honeycomb structure thereof so as to generate heat.

18. A multi-stage honeycomb heater according to claim 17, wherein the means for applying electric current comprises an electrode in electrical contact with each of the honeycomb structures.

19. A method for operating a multi-stage honeycomb heater, comprising the steps of:

providing a multi-stage honeycomb heater having at least two honeycomb heaters electrically connected to each other, said at least two honeycomb heaters having a furthest upstream honeycomb heater and an adjacent honeycomb heater which is adjacent to and downstream of the furthest upstream honeycomb heater, each of said at least two honeycomb heaters having (i) a honeycomb structure composed of an electrically conductive material, the honeycomb structure having a periphery and two ends, including a plurality of passages which are defined by partition walls and extend in an axial direction between the ends, and (ii) a catalyst composition coated on the partition walls of the honeycomb structure, said catalyst composition comprising a heat resistant inorganic oxide, and a catalytically active noble metal loaded on the inorganic oxide, wherein the honeycomb structure of the furthest upstream honeycomb heater has at least one member selected from the group consisting of means for adjusting an electrical resistance of the honeycomb structure and means for adjusting a heat capacity of the honeycomb structure so that the ratio of applied power to heat capacity of the furthest upstream honeycomb heater is larger than the ratio of applied power to heat capacity of the adjacent honeycomb heater when the furthest upstream and adjacent honeycomb heaters are simultaneously energized;

flowing exhaust gas through the multi-stage honeycomb heater from an automobile engine;

energizing the multi-stage honeycomb heater prior to engine start-up to heat at least the furthest upstream honeycomb heater to the light-off temperature of the catalyst composition thereof.

20. A method for operating a multi-stage honeycomb heater, comprising the steps of:

providing a multi-stage honeycomb heater having at least two honeycomb heaters electrically connected to each other, said at least two honeycomb heaters having a furthest upstream honeycomb heater and an adjacent honeycomb heater which is adjacent to and downstream of the furthest upstream honeycomb heater, each of said at least two honeycomb heaters having (i) a honeycomb structure composed of an electrically conductive material, the honeycomb structure having a periphery and two ends, including a plurality of passages which are defined by partition walls and extend in an axial direction between the ends, and (ii) a catalyst composition coated on the partition walls of the honeycomb structure, said catalyst composition comprising a heat resistant inorganic oxide, wherein the honeycomb structure of the furthest upstream honeycomb heater has at least one member selected from the group consisting of means for adjusting an electrical resistance of the honeycomb structure and means for adjusting a heat capacity of the honeycomb structure so that the ratio of applied power to heat capacity of the furthest upstream honeycomb heater is larger than the ratio of applied power to heat capacity of the adjacent honeycomb heater when the furthest upstream and adjacent honeycomb heaters are simultaneously energized;

flowing exhaust gas through the multi-stage honeycomb heater from an automobile engine; and energizing said multi-stage honeycomb heater substantially simultaneously with engine start-up to heat at least the furthest upstream honeycomb heater to the light-off temperature of the catalyst composition thereof, within 30 seconds from engine start-up.

* * * * *